United States Patent
Somasundaram et al.

(10) Patent No.: US 10,599,360 B2
(45) Date of Patent: Mar. 24, 2020

(54) CONCURRENT AND PERSISTENT RESERVATION OF DATA BLOCKS DURING DATA MIGRATION

(71) Applicant: VMware, Inc., Palo Alto, CA (US)

(72) Inventors: Vijay Somasundaram, Mountain View, CA (US); Sudarshan Madenur Sridhara, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 52 days.

(21) Appl. No.: 16/043,438

(22) Filed: Jul. 24, 2018

(65) Prior Publication Data

US 2020/0034063 A1  Jan. 30, 2020

(51) Int. Cl.
*G06F 3/06* (2006.01)
*G06F 9/455* (2018.01)

(52) U.S. Cl.
CPC ............ *G06F 3/0647* (2013.01); *G06F 3/067* (2013.01); *G06F 3/0619* (2013.01); *G06F 3/0664* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 8,442,955 B2 * | 5/2013 | Al Kiswany | G06F 16/188 707/692 |
| 9,678,974 B2 * | 6/2017 | Jayaraman | G06F 16/1748 |
| 2007/0208918 A1 * | 9/2007 | Harbin | G06F 11/1451 711/162 |
| 2008/0228808 A1 * | 9/2008 | Kobara | G06F 16/25 |
| 2018/0349397 A1 * | 12/2018 | Zaydman | G06F 9/45558 |
| 2019/0205429 A1 * | 7/2019 | Lee | G06F 16/119 |

* cited by examiner

*Primary Examiner* — Tracy C. Chan
(74) *Attorney, Agent, or Firm* — Patterson + Sheridan, LLP (57) ABSTRACT

A system and method of data transmission are disclosed. In certain aspects, the method, performed by a target node, includes receiving a first plurality of hash values from the source node and comparing the first plurality of hash values with a second plurality of hash values. The method also includes determining a set of common hash values corresponding to an intersection of the first plurality of hash values and the second plurality of hash values. The method further includes reserving the set of common hash values by placing the set of common hash values in a first filter stored in a memory of the target node and committing the set of common hash values by placing them in a second filter stored in a storage of the target node.

20 Claims, 6 Drawing Sheets

CONCURRENT AND PERSISTENT RESERVATION OF DATA BLOCKS DURING DATA MIGRATION

BACKGROUND

Distributed systems allow multiple clients in a network to access a pool of shared resources. For example, a distributed storage system allows a cluster of host computers ("nodes") to aggregate local storage devices (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation.

In some cases, data (e.g., associated with a virtual machine's virtual disk) may be migrated from a source host computer to a target host computer in the distributed system. In order to minimize the amount of data transmitted over the network to complete the migration, in some cases, the source host computer sends a number of hash values, associated with data blocks that the source host computer intends to migrate, to one or more target host computers. In response, a target host computer compares the received hash values with hash values stored in its storage and indicates to the source node if it is already storing any of the data blocks that the source node is intending to migrate out based on corresponding hash values stored in its storage matching received hash values. As a result of this, the source host computer is able to transmit only the remaining data blocks (e.g., the data blocks that the target host computer is not already storing) to the target host computer in order to complete the migration. In such cases, however, it is important for the target host computer to be able to prevent the removal of the data blocks that the target host computer reported as already being stored by the target host computer. If the already stored data blocks, and their corresponding hash values, are removed from the target host computer prior to the migration, the target host computer would not have the complete set of data blocks that the source host computer intended to transmit, after the migration.

DETAILED DESCRIPTION

Figure 1:
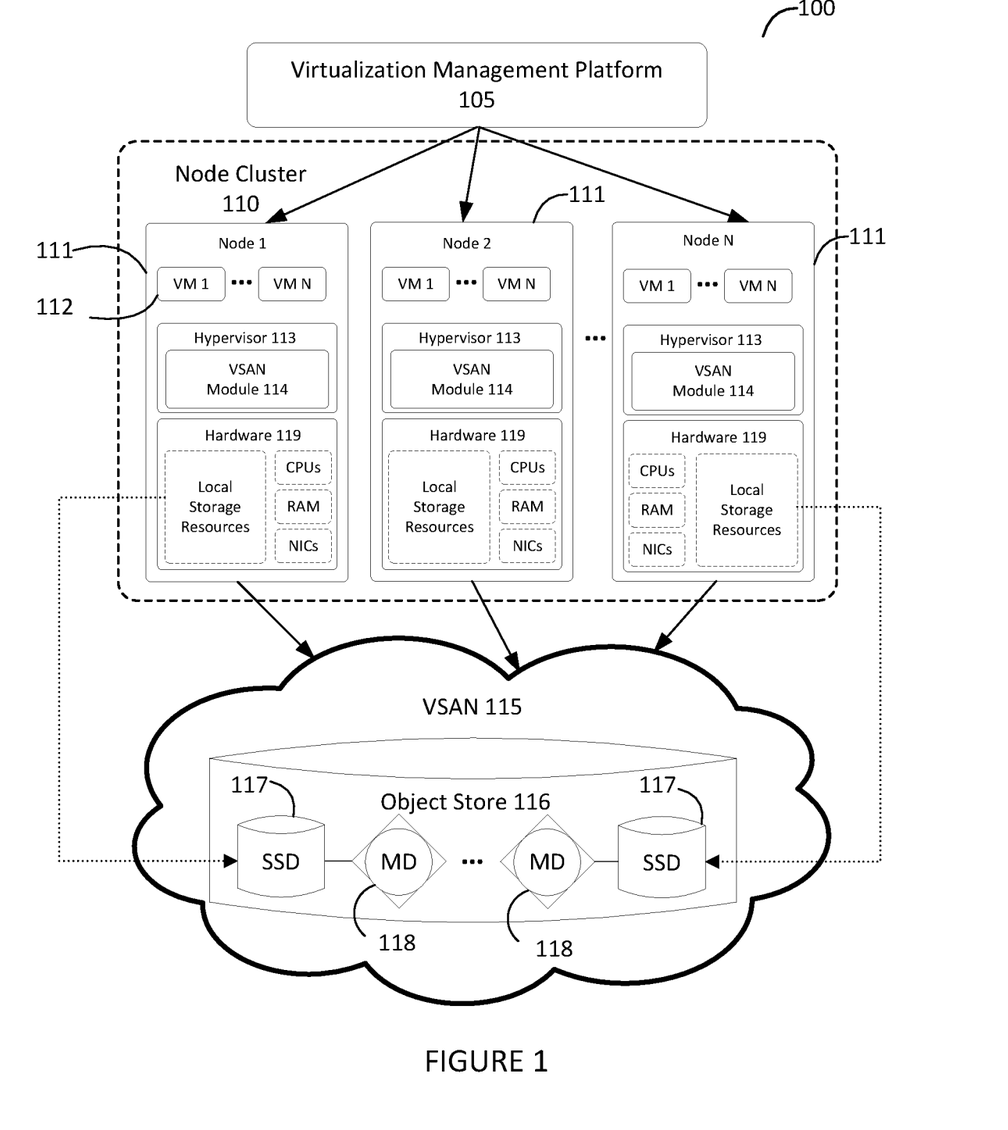
FIG. 1 illustrates an example computing environment in which one or more embodiments may be implemented, according to certain embodiments.

FIG. 1 illustrates an example computing environment in which one or more embodiments may be implemented. As shown, computing environment 100 is a software-based "virtual storage area network" (VSAN) environment that leverages the commodity local storage housed in or directly attached (hereinafter, use of the term "housed" or "housed in" may be used to encompass both housed in or otherwise directly attached) to host servers, or nodes 111 of a cluster 110, to provide an aggregate object store 116 to virtual machines (VMs) 112 running on nodes 111. The local commodity storage housed in or otherwise directly attached to each node 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

In addition, as further discussed below, each node 111 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending on its intended use (e.g., capacity, availability, IOPS, etc.), the administrator may define a storage profile or policy for each VM specifying such availability, capacity, IOPS and the like. As further described below, the VSAN module may then create an "object" for the specified virtual disk by backing it with the datastore of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes conventional computing hardware, such as one or more central processing units, random access memory, read-only memory, one or more network interface controllers, SSDs 117, and magnetic disks 118). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 for use as storage for virtual disks (or portions thereof) and other related files that may be accessed by any VM 112 residing in any of nodes 111 in cluster 110.

In one embodiment, VSAN module 114 is implemented as a "VSAN" device driver within hypervisor 113. VSAN module 114 provides access to a conceptual VSAN 115 through which an administrator can create a number of top-level "device" or namespace objects that are backed by object store 116. In one common scenario, during creation of a device object, the administrator specifies a particular file system for the device object (such device objects hereinafter also thus referred to "file system objects"). For example, each hypervisor 113 in each node 111 may, during a boot process, discover a /vsan/ root node for a conceptual global namespace that is exposed by VSAN module 114. By accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system such as a virtual machine file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

A file system object, may, itself, provide access to a number of virtual disk descriptor files accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 (through a cluster level object management or "CLOM" sub-module) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in some embodiments as further described below) traverses a hierarchy of objects using the metadata in the in-memory database in order to properly route an I/O operation request to the node that houses the actual physical local storage that backs the portion of the virtual disk that is subject to the I/O operation.

Figure 2:
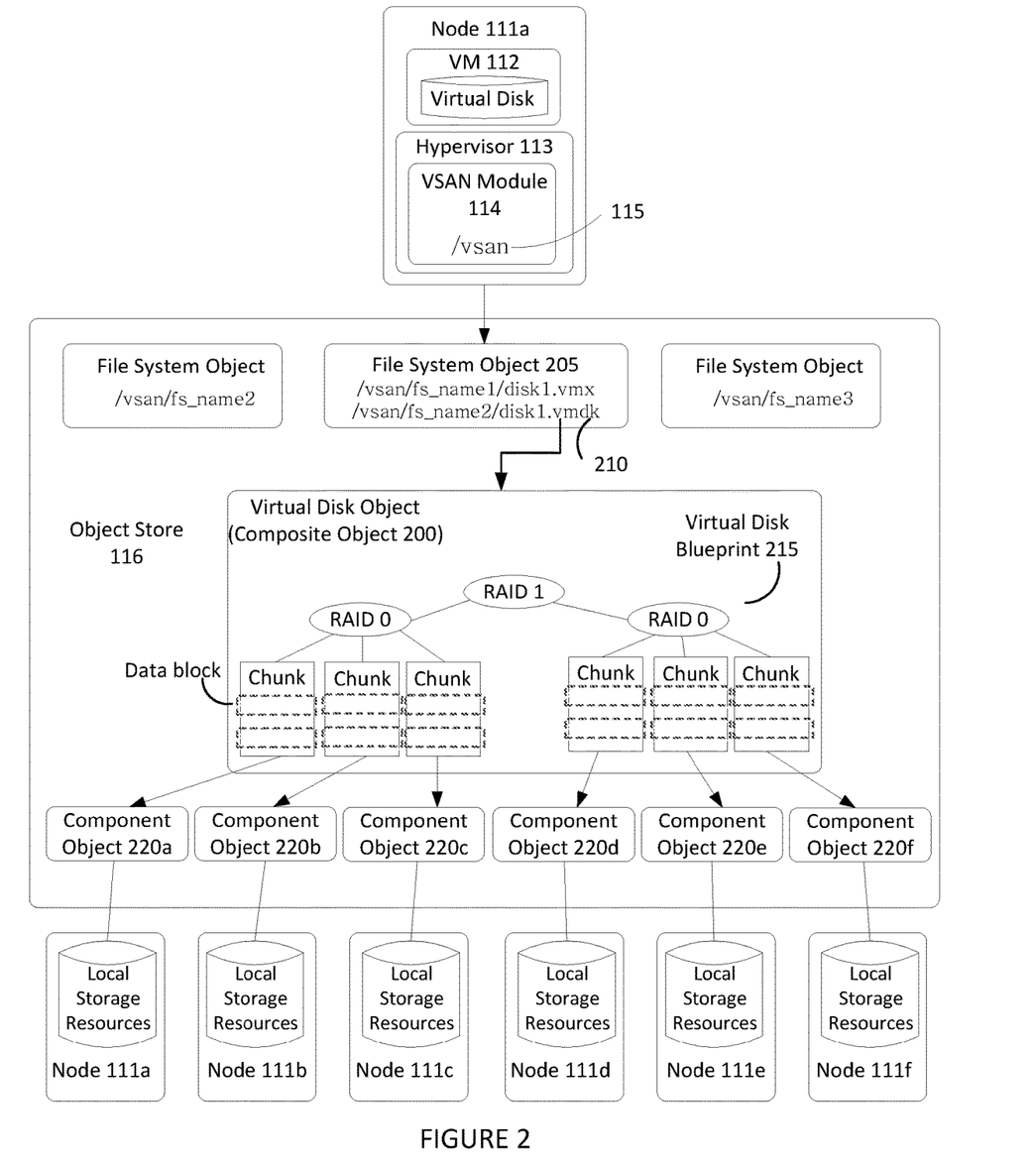
FIG. 2 illustrates an example hierarchical structure of objects organized within an object store that represent a virtual disk, according to certain embodiments.

FIG. 2 illustrates an example hierarchical structure of objects organized within object store 116 that represent a virtual disk. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed). For example, VSAN module 114, by querying its local copy of the in-memory metadata database, is able to identify a particular file system object 205 (e.g., a VMFS file system object) stored in VSAN 115 that stores a descriptor file 210 for the virtual disk. It should be recognized that the file system object 205 may store a variety of other files consistent with its purpose, such as virtual machine configuration files and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped and partitioned in a RAID 0 configuration. Composite object 200 may thus contain references to a number of "leaf" or "component" objects 220, corresponding to each data chunk (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., SDD 117, magnetic disks 118, etc.) that actually stores the data chunk (as well as the location of the data chunk within such physical resource). The RAID 1/RAID 0 combination is merely an example of how data associated with a composite object 200 may be stored by nodes 111 (e.g., nodes 111a-111f) of node cluster 110. In other examples, all data associated with composite object 200 may be stored in one node (e.g., node 111a). In yet another example, data associated with composite object 200 may be only mirrored by a RAID 1 operation such that one copy of the data may be stored in one node and another copy may be stored by another node. In other examples, other RAID operations or a combination of a variety of RAID operations (e.g., RAID1/RAID 5) may be used when distributing data associated with composite object 200. Regardless of how data associated with a VM 112's virtual disk is partitioned or copied across nodes, however, the data is still stored as a plurality of data blocks.

Figure 3:
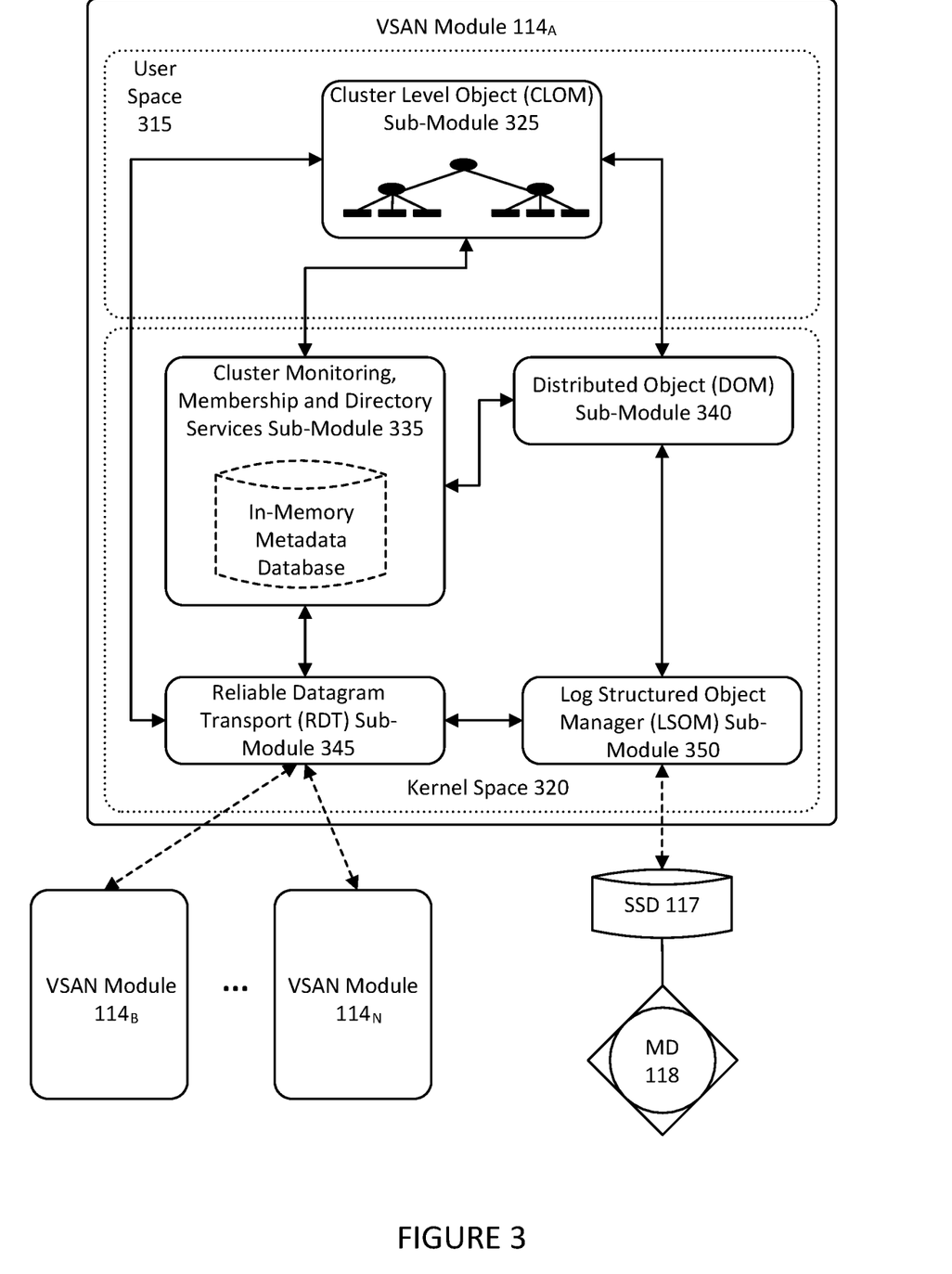
FIG. 3 illustrates components of a virtual storage area network module implemented in the computing environment of FIG. 1, according to certain embodiments.

FIG. 3 illustrates components of VSAN module 114. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In some embodiments, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in some embodiments, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ratio, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read TOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object, and more particularly, data blocks of component objects, to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and their corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node that serves as the coordinator for the particular component object (e.g., data chunk, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of node 111 running the VM would also have to communicate across the network with the DOM sub-module 340 of the coordinator. In certain embodiments, if the VM issuing the I/O operation resides on a node that is different from the coordinator of the virtual disk object subject to the I/O operation, the two DOM sub-modules 340 of the two nodes may need to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which node 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In some embodiments, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

In certain aspects, LSOM sub-module 350 of each node 111 is configured to carry out deduplication prior to storing a data block (e.g., of a VM 112's virtual disk) in the local storage of its node 111. For example, before a data block is stored, LSOM sub-module 350 examines a deduplication ("dedup.") hash table (e.g., hash table 402a in FIG. 4) stored in the local storage of the corresponding node 111 to ensure that the data block is not already stored in the storage of the node 111. The dedup hash table contains a hash of every data block that is stored in the local storage of its node 111. In certain aspects, each hash entry (e.g., row) of the dedup hash table comprises a hash value of a data block, a physical block address (PBA) of where the data block is stored on disk in the local storage of a corresponding node 111, and a reference count associated with that hash value. A reference count in a hash entry indicates the number of logical block addresses in a translation table that are pointing or mapping to the hash entry. A translation table, as described below, maps logical block addresses (LBAs) of data blocks stored on disk to hash entries in the dedup hash table. LBAs are offsets in a logical address space, which corresponds to a logical representation of disk space available to VM 112.

When a data block is being stored in the local storage of a node 111, LSOM sub-module 350 queries the translation table using the LBA that is assigned to the data block to determine if the LBA maps to any hash entries in the dedup hash table. If the LBA does not map to any hash entries, LSOM sub-module 350 then queries the dedup hash table using a hash of the data block. A hash of the data block is created by LSOM sub-module 350 using the same hash function that was used when generating the hashes in the dedup hash table. If a matching hash entry is found with the same hash value, LSOM sub-module 350 then maps the data block's LBA in the translation table to the hash entry in the dedup hash table and increments the reference count in the hash entry by one (1). If a matching hash entry is not found, LSOM sub-module 350 stores the data block in a new physical location on disk and creates a hash entry with the data block's hash value and PBA in the dedup hash table. LSOM sub-module 350 then maps the data block's LBA in the translation table to the newly created hash entry in the dedup hash table. The newly created hash entry would have a reference count of one (1) in that case.

If the LBA that is assigned to the data block is mapping to a hash entry in the dedup hash table, it means that the LBA is being over written with new data. In such an example, LSOM sub-module 350 removes the mapping between the LBA and the hash entry, resulting in the corresponding reference count to drop, and then queries the dedup hash table using the data block's hash value. If a matching hash entry is found with the same hash value, LSOM sub-module 350 then maps the data block's LBA to the hash entry and increments the reference count in the hash entry by one (1). If a matching hash entry is not found, LSOM sub-module 350 stores the data block in a new physical location on disk and creates a hash entry with the data block's hash value and PBA. LSOM sub-module 350 then maps the data block's LBA in the translation table to the newly created hash entry in the dedup hash table. The newly created hash entry would have a reference count of one (1) in that case.

In certain aspects, data stored in one node 111 (source node) of node cluster 110 may be migrated or transmitted to another node 111 (target node) in node cluster 110. The data may include data that is associated with a VM's virtual disk (e.g., composite object 200 or any of component objects 220 of VM 122's virtual disk). In one example, data may be transmitted from a source node to a target node for load balancing. In another example, a source node may be scheduled for maintenance, in which case data stored in the source node is transmitted to a target node so that the data may continue to be available during the source node's maintenance. In yet another example, one or more target nodes in node cluster 110 may be out-of-synchronization with a source node in the cluster. For example, data may be replicated across multiple nodes in node cluster 110 to ensure fault tolerance. In such example, if one of the nodes fails, it may become out-of-synchronization with the other nodes (e.g., the failed node may lose some data or it may be offline during a read operation that it would have received had it not been offline). In such an example, the source node may resynchronize the one or more target nodes by transmitting data to them that they are missing. The relocation of data in all these examples may be referred to herein as a "data migration." In these examples, the dedup hash tables of the source node and one or more of the target nodes in a node cluster may be utilized to minimize the amount of data transmitted over the network during the data migration. An example of this is illustrated by FIG. 4.

Figure 4:
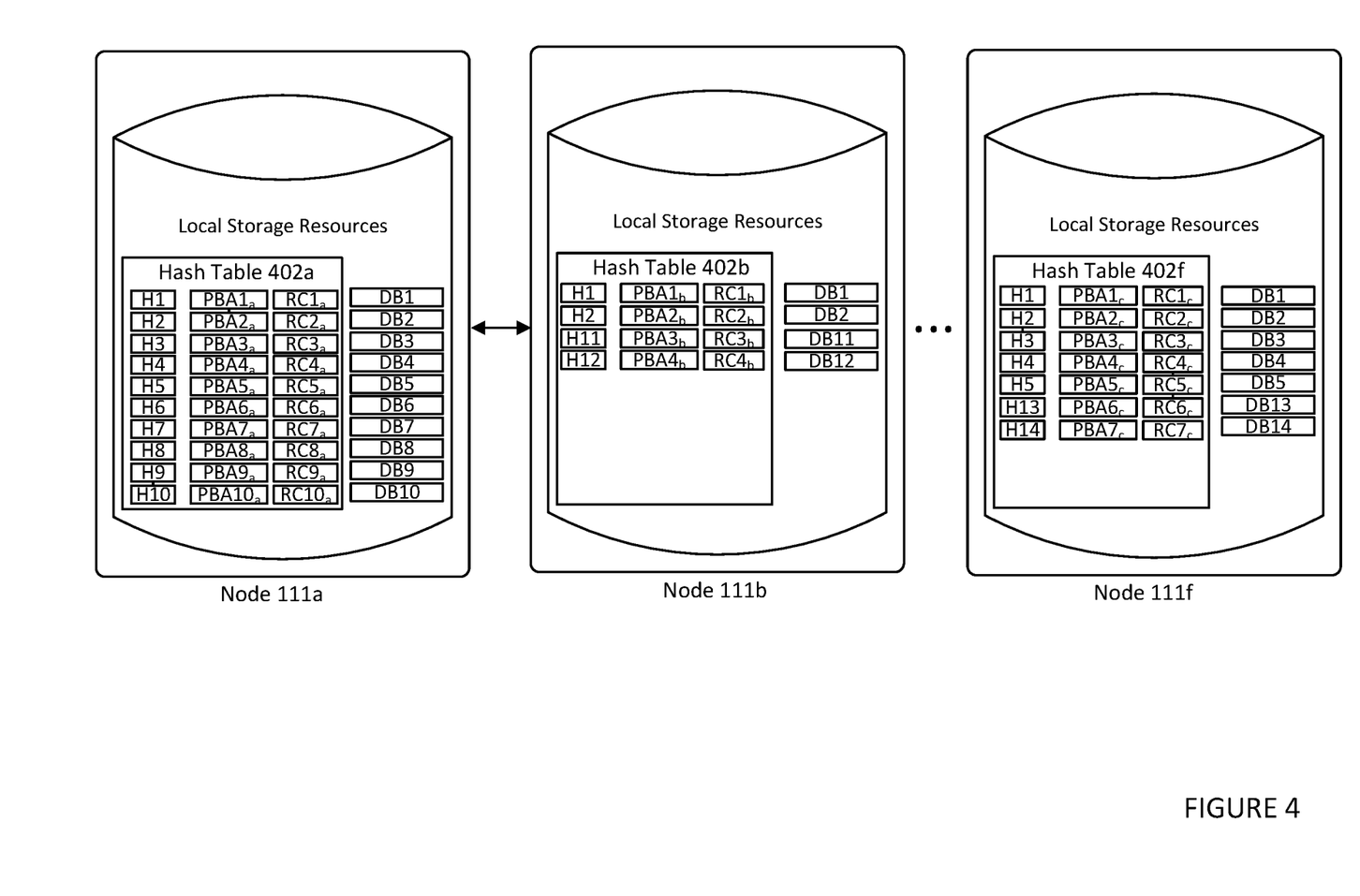
FIG. 4 illustrates an example of a node cluster including a source node and a number of potential target nodes, according to certain embodiments.

FIG. 4 illustrates an example of a node cluster including a source node 111a and a number of potential target nodes 111b-111f. As shown, source node 111a stores data blocks (DBs) 1-10 and dedup hash table 402a, including hash values H1-H10 corresponding to DBs 1-10, physical block addresses $PBA1_a$-$PBA10_a$ corresponding to where DBs 1-10 are stored on disk, and reference counts $RC1_a$-$RC10_a$. Target node 111b stores DBs 1-2 and 11-12 and a dedup hash table 402b with hash values H1-H2 and H11-H12 corresponding to DBs 1-2 and 11-12, $PBA1_b$-$PBA4_b$, and $RC1_b$-$RC4_b$. Target node 111f stores DBs 1-5 and 13-14 and a dedup hash table 402f with hash values H1-H5 and H13-H14 corresponding to DBs 1-5 and 13-14, PBA1$_c$-PBA7$_c$, and RC1$_c$-RC7$_c$. Other target nodes (e.g., target nodes 111c-111e) in the cluster are not shown for simplicity.

Prior to any data migration, source node 111a first selects the data that it intends to transmit to a potential target node. For example, source node 111a selects DBs 1-10 to be migrated out of source node 111a. Next, source node 111a examines hash table 402a and identifies H1-H10 as hash values that are associated with DBs 1-10. Source node 111a then transmits hash values H1-H10 to all target nodes 111a-111f in the node cluster. Each target node 111 in the cluster then examines its local dedup hash table (e.g. hash table that is stored in the node's local storage resources ("storage")) and compares the hash values received from source node 111a and the hash values stored in the local dedup hash table to determine the common hash values between the two groups (e.g., the intersection of the two groups). For example, target node 111b compares hash values H1-H10, received from source node 111a, with hash values H1, H2, H11, and H12 in hash table 402b. Based on that comparison, target node 111b determines H1 and H2 as common hash values between the hash values received and the hash values in hash table 402b. This means that target node 111b already stores two of the DBs 1-10 that source nodes 111a indents to migrate out. Those two data blocks are DB1 and DB2 corresponding to H1 and H2, respectively. In another example, target node 111f similarly determines that it already stores five of the DBs 1-10. Those five data blocks are DBs 1-5 corresponding to H1-H5, respectively.

Each target node then transmits their common hash values, back to source node 111a. For example, 111b transmits hash values H1-H2 to source node 111a while node 111f transmits hash values H1-H5 to source node 111a. Using the common hash values of each target node, in certain aspects, source node 111a then calculates hit ratios and selects the target node with the highest hit ratio. In other words, source node 111a selects the target node that already stores the highest number of DBs out of DBs 1-10. For example, source node 111a may determine node 111f as the node with the highest hit ratio because it already stores five of DBs 1-10 (assuming nodes 111c-111e have lower hit ratios). In certain aspects, each target node calculates its own hit ratio and transmits the hit ratio to source node 111a. In such aspects, there may be no need for source node 111a itself to calculate a hit ratio for each target node. In the example of FIG. 4, once target node 111f, having the highest hit ratio, is selected by source node 111a, source node 111a transmits DBs 6-10 to target node 111f to complete the migration. Using such a data migration technique results in minimizing the amount of data that needs to be transmitted over the network in order to migrate the data stored in source node 111a out. Accordingly, a lower amount of network bandwidth and computing resources can be used by implementing these data migration technique.

Note that FIG. 4 is only one example of how a target node may be selected for migrating data out of source node 111a. In other examples, source node 111a may use other selection criteria for selecting a target node for the data migration. Also, in some examples, there may only be one node other than the source node in the node cluster, in which case, the other node is selected by the source node as the target node. Further, in other examples, a target node may be selected by a coordinating node (e.g., coordinator of the virtual disk object stored in the source node). For example, a coordinating node may select node 111b as a target node based on certain selection criteria. In such an example, the source node transmits hash values H1-H10 to target node 111b and, in response, receives H1 and H2 back, which indicates to source node 111a to transmit DBs 3-10 to target node 111b. In yet another example, multiple target nodes in a node cluster may be out-of-synchronization, in which case the source node may select all of them for resynchronization. In such an example, the source node may transmit a number of hash values to the target nodes to determine the common hash values and proceed to resynchronize each of the target nodes by transmitting data blocks that the target node is missing.

Regardless of how a target node is ultimately selected, however, after a target node reports the common hash values or its hit ratio to the source node, it is important that the common hash values and their corresponding DBs are not removed from the local storage resources of the target node. Note that in the embodiments described herein removing a hash value from a table is the same as removing the corresponding hash entry from the table. For example, in the migration described above (e.g., source node 111a to target node 111f), after target node 111f indicates to source node 111a that it already stores DBs 1-5 (e.g., by indicating common hashes H1-H5 to source node 111a), it is important that those DBs 1-5 are not removed (e.g., over written) from the storage of node 111f prior to the completion of the migration. If, for example, DBs 2-3 are removed from node 111f during that time, transmitting only DBs 6-10 would result in an incomplete migration of DBs 1-10 from source node 111a to target node 111f. This is because subsequent to the transmission of DBs 6-10, target node 111f would only be storing DBs 1 and 4-10 and, therefore, missing DBs 2-3.

In some cases, certain techniques may be used to temporarily prevent the removal of hash values (e.g., H1-H5) and their corresponding data blocks (e.g., DBs 1-5) from the storage of a node (e.g., node 111f). For example, in some cases, a locking mechanism (e.g., mutex) may be used to block the removal of hash values from hash table 402f, which in turn blocks the removal of the corresponding data blocks from the storage of node 111f The existing locking mechanisms used for blocking the removal of hash values from of hash tables may be defined at two levels of granularity. In one example, a lock may be used for each of the hash values in a hash table, preventing the removal of only the hash values that are locked. Using a locking mechanism at this level of granularity, however, is inefficient as it requires a large amount of memory. In another example, a lock may be used for the entire hash table, which prevents removals of all hash values from the hash table. Using a locking mechanism at this level of granularity, however, is disruptive as the mechanism locks even hash values that should be allowed to be removed.

Accordingly, certain embodiments described herein relate to reserving hash values (e.g., common hash values) on a target node using counting quotient filters (CQF). A CQF is a type of an approximate member query filter (AMQ) filter. A CQF is a space-efficient probabilistic data structure used to test whether an element is a member of a set. A query of a CO' elicits a reply specifying either that the element is definitely not in the set or that the element is probably in the set. The former result is definitive such that the test does not generate false negatives. But with the latter result, there is some probability, $\varepsilon$, of the test returning "element is in the set" when in fact the element is not present in the set (i.e., a false positive).

A CQF is also able to keep track of the occurrences of elements in a data set. For example, if CQF comprises a data set of hash values, such as H1, H2, H2, H2, H3, and H3, the CQF is able to determine that there is one occurrence of H1, three occurrences of H2 and two occurrences of H3 in the data set. A CQF also supports concurrency by providing support for multiple concurrent migration processes, such that two or more different migration processes are able to insert and remove data elements (e.g., hash values) into and from the CQF. Further, a CQF is fixed in size and can be easily persisted to the storage (e.g., SDDs 117, MD 118, etc.) of a node 111. In the embodiments described herein, two CQFs may be used to prevent the removal of hash values (e.g., common hash values) and, thereby, the corresponding data blocks from the storage of a target node during a data migration operation. More specifically, in certain aspects, one of the CQFs is stored in a memory (e.g., volatile memory) of the target node (referred to as an in-memory CQF) while the other CQF is stored in the storage of the target node (referred to as an on-disk CQF). The combination of the two CQFs creates an abstract data type (ADT) that allows multiple processes to concurrently interface with the CQFs using a number of functions. The functions include a reserve function, a commit function, a rollback function, an unset function, etc.

As an example, one or more processes running within a target node may use the reserve function to reserve hash values in a local dedup hash table of the target node. When a process calls a reserve function with a set of hash values as input, the target node (e.g., VSAN module 114) inserts the set of hash values into the in-memory CQF in order to prevent the hash values' removal from the target node's dedup hash table. In certain aspects, this ensures that the data blocks, corresponding to the reserved hash values, are not removed from the storage of the target node prior to the completion of a data migration operation. In certain aspects, the in-memory CQF is configured with a lock (e.g., such as coarse-grained locking), to provide atomicity when elements (e.g., hash values) are inserted into or deleted from it. In certain aspects, the lock is only held during the time when elements are being inserted into or deleted from the in-memory CQF. Note that although the embodiments herein are described in relation to CQFs, any other filters, such as any other type of an AMQ filter, with the same characteristics as the CQF can be used to implement the embodiments described herein.

Figure 5:
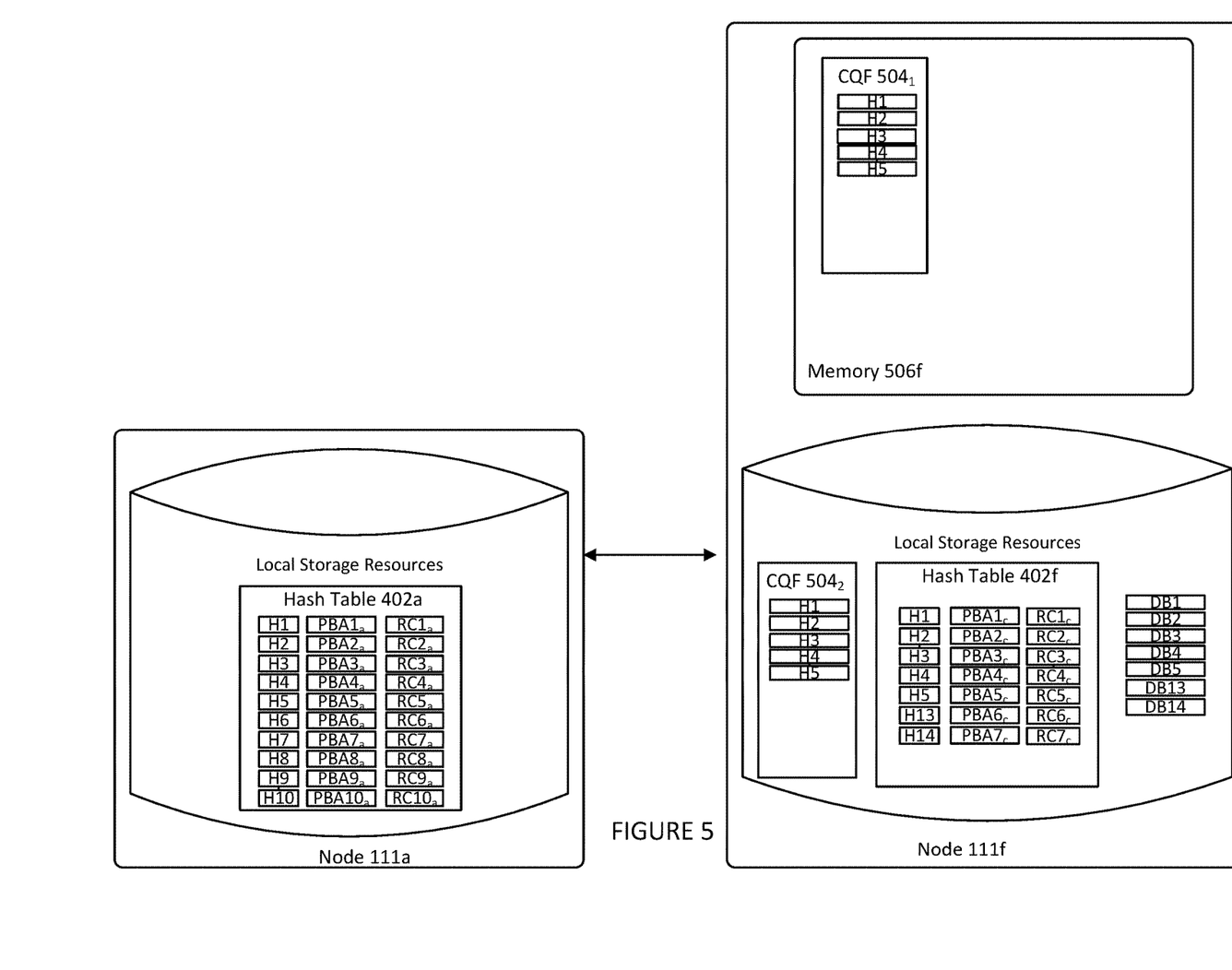
FIG. 5 illustrates an example of a target node implementing two filters, according to certain embodiments.

FIG. 5 illustrates an example of a target node 111ƒ implementing two CQFs, as described above. As shown, CQF 504₁ (the first CQF) is stored in a memory 506ƒ of node 111ƒ while CQF 504₂ (the second CQF) is stored in the storage of target node 111ƒ. In certain aspects, some or all of the target nodes in a cluster may similarly implement two CQFs. An example of how a target node, such as target node 111ƒ, utilizes the various functions discussed above, to prevent the removal of the hash values and their corresponding data blocks from its storage, is described in relation to FIG. 6.

Figure 6:
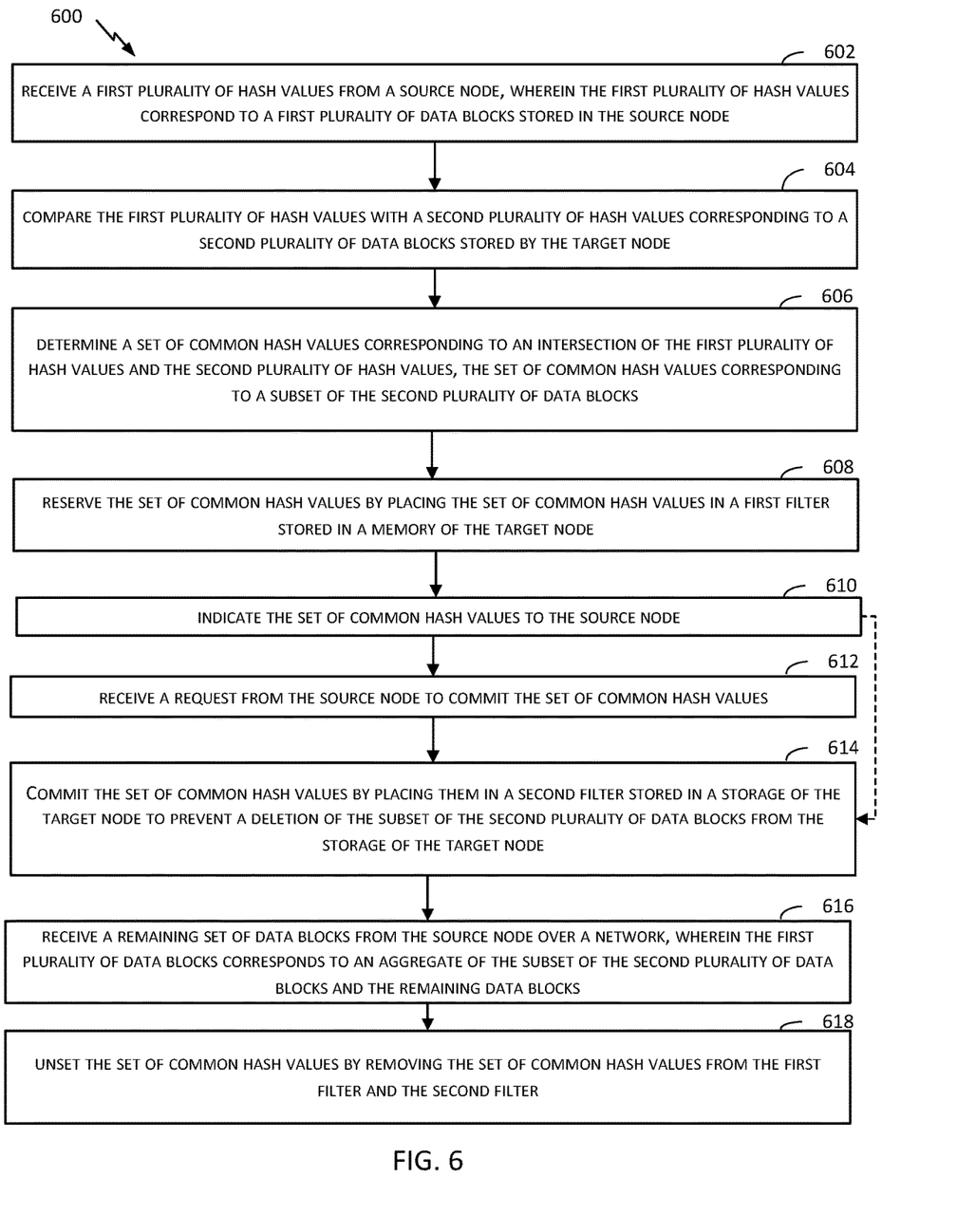
FIG. 6 is an example flow diagram that illustrates steps carried out by a virtual SAN sub-module of a target node for engaging in data transmission with a source node, according to certain embodiments.

FIG. 6 illustrates example operations 600 carried out by a target node (e.g., target node 111ƒ of FIG. 6) selected for housing data transmitted from source node (e.g., target node 111ƒ of FIG. 6). Operations 600 are described herein by reference to FIGS. 4 and 5. In certain aspects, operations 600 are performed by LSOM sub-module 350 of target node 111ƒ. More specifically, in certain aspects, operations 600 are performed by a sub-module, within LSOM sub-module 350, referred to as physical LOG (PLOG).

At block 602, the target node receives a first plurality of hash values from a source node, wherein the first plurality of hash values correspond to a first plurality of data blocks stored in the source node. For example, VSAN module 114 of target node 111ƒ receives hash values H1-H10 (first plurality of hash values) from source node 111a. Hash values H1-H10 correspond to DBs 1-10 (first plurality of data blocks) that are stored in the local storage resource of source node 111a.

At block 604, the target node compares the first plurality of hash values with a second plurality of hash values corresponding to a second plurality of data blocks stored by the target node. For example, after receiving H1-H10 from source node 111a, VSAN module 114 of target node 111ƒ compares H1-H10 with the hash values H1-H5 and H13-H14 (second plurality of hash values), which are stored in hash table 402ƒ in the storage of target node 111ƒ. As shown in FIG. 5, hash values H1-H5 and H13-H14 correspond to DBs 1-5 and 13-14. In aspects where block 604 is performed by LSOM sub-module 350, LSOM sub-module 350 queries hash table 402ƒ in the storage of node 111ƒ to find matching hash values for hash values H1-H10.

At block 606, the target node determines a set of common hash values corresponding to an intersection of the first plurality of hash values and the second plurality of hash values, the set of common hash values corresponding to a subset of the second plurality of data blocks. For example, after comparing hash values H1-H10 with hash values H1-H5 and H13-H14 in table 402ƒ, VSAN module 114 of target node 111ƒ determines a set of common hash values H1-H5 that correspond to the intersection of hash values H1-H10 and hash values H1-H5 and H13-H14. As shown, the set of common hash values H1-H5 correspond to DBs 1-5, which are a subset of DBs 1-5 and 13-14. In certain aspects, VSAN module 114 then pins hash values H1-H5 among the group of hash values H1-H5 and H13-H14 so that they can continue to remain in memory, which makes them accessible by the reservation function when determining which hash values to reserve, as described below in block 608. Pinning is a technique which ensures memory pages (e.g., the hash entries in memory) in a cache are not evicted by the cache manager, until they are "unpinned."

At block 608, the target node reserves the set of common hash values by placing the set of common hash values in a first filter stored in a memory of the target node. For example, after determining the set of common hash values, a process, associated with the data migration of source node 111a, calls the reserve function to reserve the set of common hash values by using them as input into the function. In response, as shown in FIG. 5, VSAN module 114 of target node 111ƒ reserves hash values H1-H5 by placing them into CQF 504₁. In aspects where the common hash values H1-H5 are pinned in memory 506ƒ of target node 111ƒ, by executing the reservation function, VSAN module 114 loops through all the hash values H1-H5 and H13-H14 and reserves hash values H1-H5, which have been pinned. After hash values H1-H5 are reserved, any input/output (I/O) operations that request the removal of any of hash values H1-H5 from hash table 402ƒ are rejected. Instead, the hash value(s) whose removal has been requested is marked with a "to be deleted" flag.

For example, an I/O operation may request that a data block associated with a certain LBA be over written. In response, for example, LSOM sub-module 350 queries the translation table and determines that the LBA maps to a hash entry with hash value H1. In such an example, LSOM sub-module 350 removes the mapping between the LBA and the hash entry. After the removal of the mapping, in some cases, the reference count of the hash entry in the dedup hash table may drop to zero, which indicates to LSOM sub-module 350 that the hash value needs to be deleted (as described above, in the embodiments described herein removing a hash value from a table is the same as removing the corresponding hash entry from the table). However, prior to deleting the hash value, LSOM sub-module 350 is configured to examine CQF $504_1$, in which case LSOM sub-module 350 determines that H1 is reserved. As a result, instead of deleting H1, LSOM sub-module 350 marks the hash value with a "to be deleted" flag.

At this point, the reservation of hash values H1-H5 is not persisted to the storage of node 111f. As a result, hash values H1-H5 are reserved until target node 111f is rebooted. As such, if target node 111f is rebooted prior to the completion of source node 111a's data migration, hash values H1-H5 may be removed from hash table 402f.

At block 610, the target node indicates the set of common hash values to the source node. For example, target node 111f indicates hash values H1-H5 to source node 111a. As described in relation to FIG. 4, this indicates to source node 111a that target node 111f already stores the DBs 1-5 corresponding to H1-H5. In other aspects, instead of indicating the common hash values to source node 111a, target node 111f indicates hash values corresponding to DBs that target node 111f is not storing (uncommon hash values).

In cases where source node 111a is considering multiple target nodes (e.g., target nodes 111b-111f) for the migration, using this indication, in certain aspects, source node 111a calculates a hit ratio for target node 111f or receives a hit ratio from target node 111f. Assuming target node 111f has the highest hit ratio among target nodes 111b-111f, source node 111a then selects target node 111f for the data migration. Subsequently, in certain aspects, source node 111a transmits a request to target node 111f to commit hash values H1-H5, which is described in further detail in relation to block 612.

As described in relation to FIG. 4, in order to select the target node with the highest hit ratio, source node 111a transmits hash values H1-H10 to all the target nodes 111b-111f in the cluster. Accordingly, at this stage in the migration, in certain aspects, in addition to target node 111f, other target nodes 111b-111e have all similarly performed blocks 602 through 610 of operations 600. In other words, in such aspects, when target node 111f reaches block 610 of operations 600, each of target nodes 111b-111e has also reserved a set of common hash values and indicated the reserved set to source node 111a. For example, target node 111b has reserved hash values H1-H2 by placing them in a CQF that is stored in a memory of target node 111b.

As a result, when target node 111f is selected, in certain aspects, source node 111a transmits a rollback indication to all the other target nodes in the cluster so that the other target nodes are able to allow the normal I/O operations. For example, after selecting target node 111f for the migration, source node 111a transmits a rollback indication to each one of target nodes 111b, 111c, 111d, and 111e. After receiving the rollback indication, VSAN module 114 each of target nodes 111b, 111c, 111d, and 111e then rolls back their reservations. For example, VSAN module 114 of target node 111b calls the rollback function, which removes hash values H1 and H2 from target node 111b's in-memory CQF (e.g., a CQF that is stored in the memory of target node 111b). In addition, if any reserved hash values were tagged with a "to be deleted" flag before the rollback function is called, VSAN module 114 of target node 111b may proceed to remove the hash values from the hash table stored in the storage of target node 111b, provided that is the only occurrence of that hash value in target node 111b's in-memory CQF.

As described above, a CFQ (e.g., target node 111b's in-memory CQF) supports concurrency such that two or more different migration processes are able to insert and remove data elements into and from the CQF. An example of this is illustrated when different instances of a hash value, associated with different migration processes, are concurrently reserved by the CFQ. For example, a process associated with the migration of data from source node 111a to target node 111b may request the reservation of hash values H1 and H2 in the dedup hash table of target node 111b while another process, e.g., associated with the migration of data from another source node to target node 111b, may request the reservation of hash values H1 and H11, as shown in FIG. 4. In such an example, there are two parallel or concurrent occurrences or reservations of H1 in target node 111b's in-memory CFQ. Because a CQF has the ability to count the number of elements in a data set, in the example above, target node 111b's in-memory CFQ is able to keep track of the two H1 reservations.

As a result, when target node 111b receives an indication from source node 111a to remove the reserved hash values H1 and H2 from target node 111b's in-memory CFQ, target node 111b is able to query its in-memory CQF and determine that there is still another H1 reservation in the in-memory CQF. As a result, in that example, target node 111b still does not allow an I/O operation to remove H1 from target node 111b's dedup hash table. As to H11, however, because there is only one reservation of H2 in target node 111b's in-memory CQF, target node 111b allows for H2 to be removed from the dedup hash table if the hash value is tagged with a "not to be deleted" flag.

At block 612, the target node receives a request from the source node to commit the set of common hash values. For example, VSAN module 114 of target node 111f receives a request from source node 111a to commit hash values H1-H5 by persisting them to the on-disk CQF $504_2$ (e.g., inserting H1-H5 into CQF $504_2$).

At block 614, the target node commits the set of common hash values by placing them in a second filter stored in a storage of the target node to prevent a deletion of the subset of the second plurality of data blocks from the storage of the target node. For example, VSAN module 114 of target node 111f calls a commit function to persist H1-H5 to the on-disk CQF $504_2$ (e.g., inserting H1-H5 into CQF $504_2$). By persisting H1-H5 to CQF $504_2$, target node 111f ensures that hash values H1-H5 would continue to be reserved even in case of a reboot (e.g., to make the reservation of H1-H5 persistent). For example, if target node 111f is rebooted after committing H1-H5, CQF $504_2$ is still stored and accessible after the reboot. As such, in certain aspects, a copy of CQF $504_2$ is then placed into memory 506f and acts the new in-memory CQF.

As described above, in certain aspects, a coordinating node, that coordinates the data (e.g., coordinator of composite object 200, as described in relation to FIG. 2) being migrated from a source node, selects the target node for the data migration. An example of this may occur when the coordinating node is configured to perform node selection using selection criteria that the source node is not configured to perform (e.g., a selection criteria other than calculating hit ratios) or when the coordinating node has access to information about potential target nodes, that is not accessible to the source node, and is therefore able to perform a better node selection. Another example of this may occur when a certain node is out-of-synchronization, in which case the coordinating node may select that node as the target node. Also, in some aspects, there may only be one target node in the cluster that the source node is able to transmit its data to. In the examples above, source node 111a may not engage in the selection of a target node by sending hash values to multiple nodes and calculating hit ratios based on common hash values received from the target nodes. Accordingly, in such aspects, the target node does not perform block 612 of operations 600 and moves straight from block 610 to block 614 of the operations. This is because, in such aspects, the target node determines that it is already selected for the data migration and, therefore, there is no need to wait for a request to be received from the source node in order to commit the set of common hash values.

As such, in certain aspects, when the source node engages in node selection, the target node waits for a request (e.g., block 612) from the source node before committing the set of common hash values. In other words, in such aspects, block 614 is performed in response to receiving a request from the source node in block 612. However, in other aspects where the target node determines that it is already selected for the data migration, it skips block 612 and continues to perform block 614 after performing block 610.

At block 616, the target node receives a remaining set of data blocks from the source node over a network, wherein the first plurality of data blocks corresponds to an aggregate of the subset of the second plurality of data blocks and the remaining data blocks. For example, target node 111f receives DBs 6-10 from source node 111a. At this point, target node 111f has received all the missing data blocks from source node 111a and the migration may be complete.

At block 618, the target node unsets the set of common hash values by removing the set of common hash values from the first filter and the second filter. For example, VSAN module 114 of target node 111f calls the unset function to remove H1-H5 from CQF $504_1$ and CQF $504_2$. This allows normal I/O operations to continue and hash values H1-H5 to be removed from dedup hash table 402f if requested by a certain I/O operation. Also, as discussed, if any reserved hash values were tagged with a "to be deleted" flag before the unset function is called, VSAN module 114 may proceed to remove the hash value from dedup hash table 402f, unless that is not the only occurrence of that hash value in CQF $504_1$.

Accordingly, the aspects described herein provide a technical solution for solving a technical problem with respect to efficient deduplication of data across nodes. More specifically, the technical solution prevents the removal of the common hash values and their corresponding data blocks from the local storage of the target node after the target node has already indicated that it stored those data blocks. As described above, if the removal of the common hash values and their corresponding data blocks is not prevented, it may lead to an inefficient and incomplete migration. Therefore, the use of efficient structures, such as CQFs, enables a concurrent and persistent reservation of such data blocks during the data migration. This reduces the amount of compute resources and network resources needed to complete a data migration. Note that although the embodiments herein relate to data migration between a source node and a target node in a VSAN environment, the embodiments may be implemented in any storage environment and with respect to any data migration operation.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for use by a target node for preventing a removal of data blocks during data transmission from a source node, comprising:
receiving a first plurality of hash values from the source node, wherein the first plurality of hash values corresponds to a first plurality of data blocks stored in the source node;
comparing the first plurality of hash values with a second plurality of hash values corresponding to a second plurality of data blocks stored by the target node;
determining a set of common hash values corresponding to an intersection of the first plurality of hash values and the second plurality of hash values, the set of common hash values corresponding to a set of common data blocks that are a subset of the second plurality of data blocks and are not received from the source node during the data transmission;

reserving the set of common hash values by placing them in a first filter stored in a memory of the target node to prevent a removal of the set of common data blocks from a storage of the target node;

committing the set of common hash values by placing them in a second filter stored in the storage of the target node to make the reservation of the set of common hash values persistent; and receiving a remaining set of data blocks from the source node over a network, wherein the remaining set of data blocks are a subset of the first plurality of data blocks that do not correspond to the set of common data blocks.

2. The method of claim 1, further comprising:
providing the source node with the set of common hash values.

3. The method of claim 1, further comprising:
unsetting, after receiving the remaining set of data blocks, the set of common hash values from the first filter and the second filter to allow a deletion of the set of common set of data blocks.

4. The method of claim 1, wherein the first filter still comprises an instance of a hash value in the set of common hash values after the set of common hash values is unset, the instance of the hash value corresponding to a data transmission from a second source node and preventing a removal of a corresponding data block until the instance of the hash value is also unset.

5. The method of claim 1, wherein the first and the second filters are counting quotient filters.

6. The method of claim 1, further comprising:
pinning the set of hash values in the memory prior to reserving the set of common hash values.

7. The method of claim 1, further comprising:
creating in the memory a copy of the second filter stored on the disk after a failure of the target node.

8. The method of claim 1, further comprising:
receiving a request from the source node to commit the set of common hash values, wherein the committing is in response to the request.

9. A target computer system, comprising:
a non-transitory memory comprising executable instructions; and
a processor in data communication with the memory and configured, by executing the executable instructions, to:
receive a first plurality of hash values from a source computer system, wherein the first plurality of hash values corresponds to a first plurality of data blocks stored in the source computer system;
compare the first plurality of hash values with a second plurality of hash values corresponding to a second plurality of data blocks stored by the target computer system;
determine a set of common hash values corresponding to an intersection of the first plurality of hash values and the second plurality of hash values, the set of common hash values corresponding to a set of common data blocks that are a subset of the second plurality of data blocks and are not received from the source computer system during the data transmission;
reserve the set of common hash values by placing them in a first filter stored in a memory of the target computer system to prevent a removal of the set of common data blocks from a storage of the target computer system;
commit the set of common hash values by placing them in a second filter stored in the storage of the target computer system to make the reservation of the set of common hash values persistent; and
receive a remaining set of data blocks from the source computer system over a network, wherein the remaining set of data blocks are a subset of the first plurality of data blocks that do not correspond to the set of common data blocks.

10. The target computer system of claim 9, wherein the processor is further configured to:
provide the source computer system with the set of common hash values.

11. The target computer system of claim 9, wherein the processor is further configured to:
unset, after receiving the remaining set of data blocks, the set of common hash values from the first filter and the second filter to allow a deletion of the set of common set of data blocks.

12. The target computer system of claim 9, wherein the first filter still comprises an instance of a hash value in the set of common hash values after the set of common hash values is unset, the instance of the hash value corresponding to a data transmission from a second source node and preventing a removal of a corresponding data block until the instance of the hash value is also unset.

13. The target computer system of claim 9, wherein the first and the second filters are counting quotient filters.

14. The target computer system of claim 9, wherein the processor is further configured to:
pin the set of hash values in the memory prior to reserving the set of common hash values.

15. The target computer system of claim 9, wherein the processor is further configured to:
creating in the memory a copy of the second filter stored on the disk after a failure of the target node.

16. The target computer system of claim 9, wherein the processor is further configured to:
receive a request from the source computer system to commit the set of common hash values, wherein the committing is in response to the request.

17. A target computer system, comprising:
means for receiving a first plurality of hash values from a source computer system, wherein the first plurality of hash values corresponds to a first plurality of data blocks stored in the source computer system;
means for comparing the first plurality of hash values with a second plurality of hash values corresponding to a second plurality of data blocks stored by the target computer system;
means for determining a set of common hash values corresponding to an intersection of the first plurality of hash values and the second plurality of hash values, the set of common hash values corresponding to a set of common data blocks that are a subset of the second plurality of data blocks and are not received from the source computer system during the data transmission;
means for reserving the set of common hash values by placing them in a first filter stored in a memory of the target node to prevent a removal of the set of common data blocks from a storage of the target computer system;
means for committing the set of common hash values by placing them in a second filter stored in the storage of the target computer system to make the reservation of the set of common hash values persistent; and means for receiving a remaining set of data blocks from the source computer system over a network, wherein the remaining set of data blocks are a subset of the first plurality of data blocks that do not correspond to the set of common data blocks.

18. The target computer system of claim 17, further comprising:

means for unsetting, after receiving the remaining set of data blocks, the set of common hash values from the first filter and the second filter to allow a deletion of the set of common set of data blocks.

19. A non-transitory computer readable medium having instructions stored thereon for performing a method comprising:

receive a first plurality of hash values from a source node, wherein the first plurality of hash values corresponds to a first plurality of data blocks stored in the source node;

compare the first plurality of hash values with a second plurality of hash values corresponding to a second plurality of data blocks stored by the target node;

determine a set of common hash values corresponding to an intersection of the first plurality of hash values and the second plurality of hash values, the set of common hash values corresponding to a set of common data blocks that are a subset of the second plurality of data blocks and are not received from the source node during the data transmission;

reserve the set of common hash values by placing them in a first filter stored in a memory of the target node to prevent a removal of the set of common data blocks from a storage of the target node;

commit the set of common hash values by placing them in a second filter stored in the storage of the target node to make the reservation of the set of common hash values persistent; and receive a remaining set of data blocks from the source node over a network, wherein the remaining set of data blocks are a subset of the first plurality of data blocks that do not correspond to the set of common data blocks.

20. The non-transitory computer readable medium of claim 19, wherein the method further comprises:

unsetting, after receiving the remaining set of data blocks, the set of common hash values from the first filter and the second filter to allow a deletion of the set of common set of data blocks.

* * * * *

UNITED STATES PATENT AND TRADEMARK OFFICE
CERTIFICATE OF CORRECTION

PATENT NO. : 10,599,360 B2
APPLICATION NO. : 16/043438
DATED : March 24, 2020
INVENTOR(S) : Vijay Somasundaram and Sudarshan Madenur Sridhara Page 1 of 1

It is certified that error appears in the above-identified patent and that said Letters Patent is hereby corrected as shown below:

In the Specification

Column 5, Line 38: from "400 GB, a reservation of 150 read TOPS, a reservation of" to "400 GB, a reservation of 150 read IOPS, a reservation of"

Column 10, Line 58: from "a CO' elicits a reply specifying either that the element is" to "a CQF elicits a reply specifying either that the element is"

Signed and Sealed this
First Day of September, 2020

Andrei Iancu
*Director of the United States Patent and Trademark Office*